(12) United States Patent
Volodarsky et al.

(10) Patent No.: US 7,636,769 B2
(45) Date of Patent: Dec. 22, 2009

(54) MANAGING NETWORK RESPONSE BUFFERING BEHAVIOR

(75) Inventors: Michael D. Volodarsky, Bellevue, WA (US); Erik B. Olson, Bountiful, UT (US); Anil K. Ruia, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/404,412

(22) Filed: Apr. 14, 2006

(65) Prior Publication Data

US 2007/0244993 A1  Oct. 18, 2007

(51) Int. Cl.
*G06F 15/16* (2006.01)
(52) U.S. Cl. .................. 709/219; 710/1; 710/108; 711/100; 711/111
(58) Field of Classification Search .............. 703/223, 703/219; 711/100
See application file for complete search history.

(56) References Cited

U.S. PATENT DOCUMENTS

| | | | |
|---|---|---|---|
| 5,727,149 A * | 3/1998 | Hirata et al. ............. | 709/250 |
| 6,411,994 B2 * | 6/2002 | van Allen et al. ......... | 709/219 |
| 6,571,332 B1 | 5/2003 | Miranda et al. | |
| 6,735,647 B2 | 5/2004 | Boyd et al. | |
| 6,973,555 B2 | 12/2005 | Fujiwara et al. | |
| 2001/0032295 A1 * | 10/2001 | Tsai et al. ............... | 711/118 |
| 2002/0026502 A1 * | 2/2002 | Phillips et al. ............ | 709/219 |
| 2002/0075875 A1 * | 6/2002 | Dravida et al. ........ | 370/395.21 |
| 2002/0089941 A1 | 7/2002 | Hwang et al. | |
| 2002/0143973 A1 * | 10/2002 | Price ...................... | 709/231 |
| 2002/0194390 A1 | 12/2002 | Elving | |
| 2003/0182532 A1 | 9/2003 | Park et al. | |
| 2005/0094447 A1 | 5/2005 | Chung | |
| 2005/0204360 A1 | 9/2005 | Meleshchuk | |
| 2005/0216569 A1 | 9/2005 | Coppola et al. | |
| 2005/0267891 A1 | 12/2005 | Shimizu | |
| 2005/0289214 A1 * | 12/2005 | Adjakple et al. ........... | 709/200 |

FOREIGN PATENT DOCUMENTS

KR    20020043972    6/2002

(Continued)

OTHER PUBLICATIONS

Robert L. Gendry "IMS Database Buffer Handlers" (http://www-01.ibm.com/support/docview.wss?uid=swg27011830&aid=1).*

(Continued)

*Primary Examiner*—Ario Etienne
*Assistant Examiner*—Randy Scott
(74) *Attorney, Agent, or Firm*—Workman Nydegger

(57) ABSTRACT

The present invention extends to methods, systems, and computer program products for managing network response buffering behavior. A computer system receives a request for content from a client. The computer system has a default response buffering behavior used when transferring content. The computer system maps the request to a handler configured to serve the requested content. The computer system accesses buffering behavior data for the handler. The computer system determines that the requested content is to be transferred in accordance with altered response buffering behavior based at least on the buffering behavior data. The altered response buffering behavior corresponds to the requested content as an exception to the default response buffering. The computer system accesses a portion of the requested content from the handler. The computer system transfers the portion of requested content to the client in accordance with the altered response buffer behavior.

17 Claims, 3 Drawing Sheets

FOREIGN PATENT DOCUMENTS

| | | |
|---|---|---|
| KR | 20020076028 | 10/2002 |
| KR | 20030030050 | 4/2003 |
| WO | WO 01/01338 A1 | 1/2001 |
| WO | WO 2005/119468 A2 | 12/2005 |

OTHER PUBLICATIONS

Ronnie Johndas "Steps Involved in Exploiting a Buffer Overflow Vulnerability using SHE Handler" (http://www.infosecwriters.com/text_resources/pdf/RJohndas_Buffer_Overflow_SEH_Handler.pdf).*

Symantec "Microsoft MDAC Function Broadcast Response Buffer Overrun Vulnerability", 5 pages Jan. 13, 2004 http://securityresponse.symantec.com/avcenter/security/Content/9407.html.

Fox Web Documentation "Response Object", 9 pages http://www.foxweb.com/document/index.htm?page=/document/ResponseObject.htm.

Intel "Intel I/O Acceleration Technology", 4 pages Copyright 2005 http://www.intel.com/technology/ioacceleration/306484.pdf.

* cited by examiner

MANAGING NETWORK RESPONSE BUFFERING BEHAVIOR

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic content) between a number of computer systems and/or other electronic devices via wired and/or wireless computer networks.

In many computing environments content is exchanged in a request/response format. For example, a Web browser at a requesting computer system sends a request for content to a Web server at a server computer system. The server computer system receives the request and the Web server processes the request (e.g., passing the request through a pipeline of cooperative serve side components) to identify requested content. The Web server then formulates a response to include identified requested content. The server computer system sends the response back to the requesting computer system. The requesting computer system receives the response and the Web browser presents the requested content.

Web servers can utilize various different techniques when formulating a response to include requested content and sending a response that includes requested content. Streaming is one technique for formulating and sending a response that includes requested content. Streaming includes a Web server sending portions of requested content to a Web browser as the portions of requested content become available (e.g., from application components). For example, a Web server may stream audio/video file to a Web browser at a specified rate until transfer of the audio/video file is complete.

Response buffering is another technique for formulating a response that includes requested content. Response buffering includes a Web server storing portions of requested content in memory to collect a complete response in memory before sending any requested content to a Web browser. After collection of requested content is complete, a complete response is sent to the Web browser. For example, a Web server may store various different HTML portions in memory until all the HTML portions for a Web page are collected. After all of the HTML portions are collected, the Web server can send a completed Web page to a Web browser.

Response buffering can be beneficial for a variety of reasons. For example, response buffering can improve server performance in a variety of ways. Response buffering makes more efficient use of network bandwidth and reduces the overhead associated with sending frequent responses that include small amounts of requested content (e.g., relative to an optimal packet size). This can be of particular benefit for server applications that build dynamic content because these applications frequently generate a high frequency of smaller portions of content.

Additionally, response buffering enables post-processing of a response prior to sending the response. For example, a Web server can compress, encrypt, filter, cache, etc., a response prior to sending the response to a Web browser.

However, response buffering may not be appropriate for some applications and content types. For example, an application that generates large amounts of content may not be able to buffer the content due to memory overhead and/or constraints. Further, some applications may require streaming behavior (e.g., video, audio, etc.) and thus are not compatible with response buffering.

Web server platforms often support multiple content types and multiple application technologies that each has different buffering requirements. However, there are limited mechanisms for controlling response buffering per content type and/or per application. Additionally, buffering requirements can change over time, for example, depending on run-time characteristics (e.g., size) of a response.

Unfortunately, a Web server typically has no way to adapt to changed run-time characteristics. Thus, a Web server may select less appropriate response buffer behavior based on prior configuration and/or typical characteristics of a content type or application, even when more appropriate response buffer behavior is possible for a particular response. For example, a Web server may be configured to buffer portions of requested content even though an application handle for the requested content provides its own buffer (resulting in at least partial double buffer). On the other hand, a Web server may be configured to not buffer requested content based on a content type, even when the requested content includes a number of smaller portions of content.

Further, in some environments, response buffering can cause transfer requirements for content to be violated. For example, buffering content that has a time to first byte requirement or a specified transfer rate requirement can cause the transfer of content to exceed the time to first byte requirement or cause content to be transferred at a rate less than the specified transfer rate. Thus, to avoid violating transfer requirements, a Web server may default to never buffering content of any type (or may not include response buffering functionality at all). Accordingly, even those content types that would benefit from response buffering are not allowed to or cannot utilize response buffering.

BRIEF SUMMARY

The present invention extends to methods, systems, and computer program products for managing network response buffering behavior. A computer system receives a request for content from a client. The computer system has a default response buffering behavior used when transferring content. The computer system maps the request to a handler configured to serve the requested content.

The computer system accesses buffering behavior data for the handler. The computer system determines that the requested content is to be transferred in accordance with altered response buffering behavior based at least on the buffering behavior data. The altered response buffering behavior corresponds to the requested content as an exception to the default response buffering. The computer system accesses a portion of the requested content from the handler.

The computer system transfers the portion of requested content to the client in accordance with the altered response buffer behavior.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
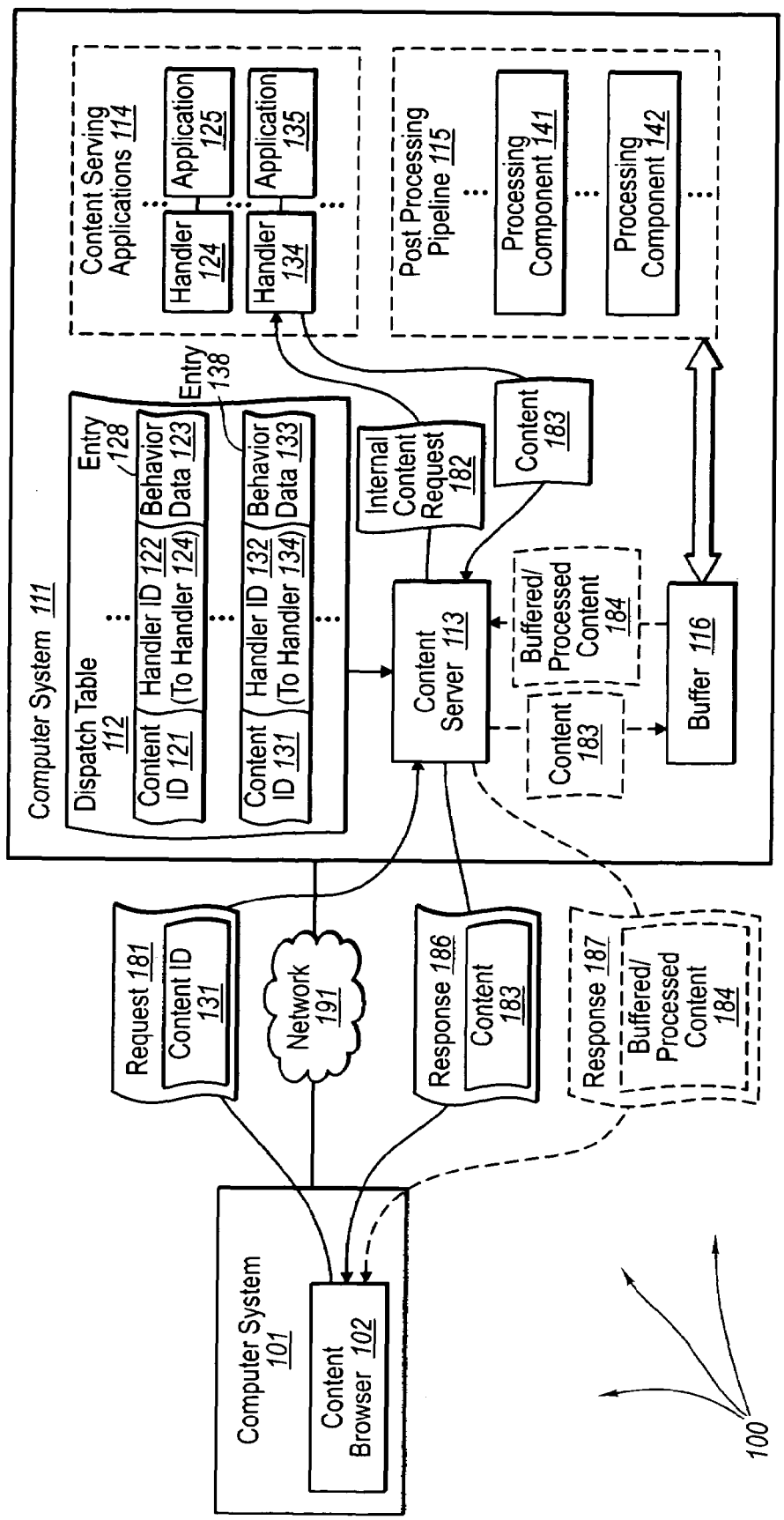
FIG. 1 illustrates an example computer architecture that facilitates managing network response buffering behavior.

The present invention extends to methods, systems, and computer program products for managing network response buffering behavior. A computer system receives a request for content from a client. The computer system has a default response buffering behavior used when transferring content. The computer system maps the request to a handler configured to serve the requested content.

The computer system accesses buffering behavior data for the handler. The computer system determines that the requested content is to be transferred in accordance with altered response buffering behavior based at least on the buffering behavior data. The altered response buffering behavior corresponds to the requested content as an exception to the default response buffering. The computer system accesses a portion of the requested content from the handler. The computer system transfers the portion of requested content to the client in accordance with the altered response buffer behavior.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates managing network response buffering behavior. Computer architecture 100 includes computer system 101 and computer system 111. Each of computer system 101 and computer system 111 are connected to network 191. Network 191 can be any type of network, such as, for example, a Local Area Network ("LAN"), a Wide Area Network ("WAN"), or even the Internet. Thus, the various components at computer system 101 and computer system 111 can receive data from and send data to each other, as well as other components connected to network 191. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), etc.) over network 191.

Generally, computer system 101 is configured to request, receive, and present content. For example, content browser 102 (e.g., a Web browser) can send a request for content including a content ID (e.g., a Uniform Resource Locator ("URL")) and a return electronic address onto network 191. Components of network 191 (e.g., routers) can route the request to a server computer system (e.g., including a Web server) identified in the content ID. The computer system 101 can receive requested content in a response from the server computer system (e.g., sent to the return electronic address). Computer system 101 can process the requested content and content browser 102 can present the requested content.

Generally, computer system 111 is configured to receive requests for content, process the requests to identify requested content, and return identified content in a response to a received request. For example, content server 113 (e.g., a Web server) can receive a request for content including a content ID (e.g., a Uniform Resource Locator ("URL")) and a return electronic address from network 191. Content server 113 can refer to dispatch table 112 to identify an application handler in content serving applications 114 that can produce the requested content. Content server 113 can forward an internal content request (e.g., a program call) to an identified application handler.

The identifier application handler can return at least a portion of the requested content to content server 113 in response to the internal content request. Depending on content type (e.g., a HypterText Markup Language ("HTML") document, image data, audio data, video data, etc.), an application handler may return requested content differently. For example, when returning an HTML document, a handler may return the complete HTML document as a single portion of content. On the other hand, for video data, a handler may return portions of the video data as the portions of video data are generated.

Computer system 111 also includes buffer 116. Depending on various inputs content server 113 may or may not buffer requested content in buffer 116 before sending a response that includes requested content. Some inputs can be runtime information, such as, for example, response size and handler content generation speed. Other inputs can be rules, such as, for example, default buffering behavior and handler specific buffering behavior data, that indicate response buffering behavior that is to occur based on other inputs, for example, runtime information.

When requested content is not buffered, content server 113 can send a response (e.g., using a return electronic address), including the requested content, to the computer system that requested the content. When requested content is buffered in buffer 116, processing components of post processing pipeline 115 can process (e.g., encrypt, filter, buffer, cache, etc.) the requested content. When processing is complete, content server 113 can retrieve buffered and/or processed content from buffer 116. Content server 113 can send a response (e.g., using a return electronic address), including the buffered and/or processed content, to the computer system that requested the content. Web browser 102 can receive and display any buffered and/or unbuffered content.

Figure 2:
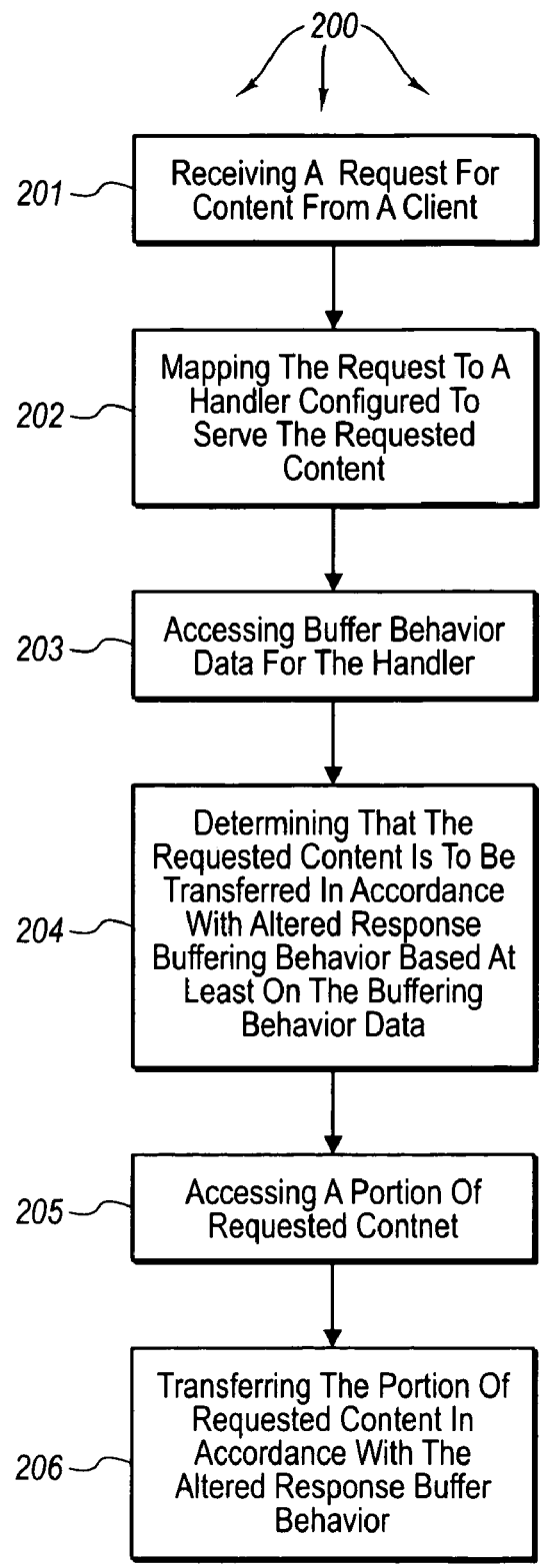
FIG. 2 illustrates a flow chart of an example method for managing network response buffering behavior.

FIG. 2 illustrates a flow chart of an example method 200 for managing network buffer response behavior. The method 200 will be described with respect to the components and data depicted in computer architecture 100.

Method 200 includes an act of receiving a request for content from a client (act 201). For example, content server 113 can receive request 181, including content ID 131 (e.g., a URL), from content browser 102. Content browser 102 can send request 181, which can also include an electronic address for computer system 101, to request content for presentation at content browser 102.

Content server 113 can have default response buffering behavior used when transferring content. For example, a default configuration for content server 113 can be to completely buffer requested content in buffer 116 before sending a response that includes the requested content. Thus by default, a complete response can be available to processing components 141, 142, etc., for post processing. Alternately, a default configuration for content server 113 can be to buffer a specified amount of content (even if the specified amount is less than all of the requested content) before sending a response that includes requested content. For example, the specified amount can be set to a packet size used on network 191. On the other hand, content server 113 can also be configured by default to send requested content without buffering the requested content.

Content server 113 can have varied default behavior based on content type. For example, default behavior for HTML documents can be complete buffering. On the other hand, default behavior for audio data can be no buffering. Image data may have partially buffering up to the packet size of network 191. However, it should be understood that the expressly described default buffering behaviors based on content type are merely examples, and that other default buffering behaviors for these and other content types are possible.

Content server 113 can have varied default behavior based on application (whether the applications produce the same or different types of content). In some embodiments, different application handlers are configured to produce the same content type. For example, handler 124 may be a HyperText Preprocessor ("PHP") handler configured to produce HTML documents (e.g., by executing PHP script code). Likewise, hander 134 may be an Active Server Pages ("ASP") handler configured to produce HTML documents (e.g., by executing VB script or Jscript code). A further handler may even be a Cold Fusion handler configured to produce HTML documents (e.g., by processing executing tags written in Cold Fusion Markup Language ("CFML")).

The default buffering behavior for HTML produced by handler 124 can differ from the default behavior for HTLP produced by handler 134 and other handlers that produce HTML. For example, default behavior for HTML documents produced by handler 124 can include complete buffering. On the other hand, HTML documents produced by handler 134 can include buffering up to a specified size.

In other embodiments, different application handlers are configured to produce the different content types. The default buffering behavior for these applications handlers can also be varied. However, it should be understood that the expressly described default buffering behaviors based on application are merely examples, and that other default buffering behaviors for these and other applications are possible.

Method 200 includes an act of mapping the request to a handler configured to server the requested content (act 202). For example, in response to receiving request 181, content server 113 can map request 181 to handler 134. As depicted, dispatch table 112 can have one or more entries that include a content ID, a handler ID, and behavior data. A handler ID represents the identity of a handler at computer system 111 that is configured to produce content requested by a corresponding content ID. Behavior data indicates the response buffering behavior (potentially altering default response buffering behavior) that is to be associated with content produced at the identified handler.

To map a request, content server 113 can refer to dispatch table 112 to identify a handler ID corresponding to a received content ID. For example, content server 113 can refer to dispatch table 112 to determine that entry 138 corresponds to content ID 131. Within entry 138, handler ID 132 can be a pointer to handler 134. Behavior data 133 indicates the response buffering behavior (potentially altering default response buffering behavior) that is to be associated with content produced at handler 134.

Entry 128 includes content ID 121, handler ID 122, and behavior data 123. Thus, when appropriate, content server 113 can refer to dispatch table 112 to determine that entry 128 corresponds to content ID 121. Within entry 139, handler ID 122 can be a pointer to handler 124. Behavior data 123 indicates response buffering behavior (potentially altering default response buffering behavior) that is to be associated with content produced at handler 124.

Method 200 includes an act of accessing buffer behavior for the handler (act 203). For example, content server 113 can access behavior data 133 for handler 134. Behavior data 133 can indicate that handler 134 is to buffer content produced at handler 134 in accordance with default response buffering behavior. For example, when default response buffering behavior is to completely buffer requested content, behavior data can include a value that indicates compliance with default response buffering behavior. On the other, behavior data 133 can indicate that handler 134 is to buffer content produced at handler 134 in accordance with response buffer behavior that differs from default response buffering behavior. For example, when default response buffering behavior is to completely buffer requested content, behavior data can include a value (e.g., zero) that indicates content produces at handler 134 is not to be buffered at all.

Generally, behavior data can include any data indicative of how response buffering behavior is to be managed, for example, based on content type, application, response size, handler content generation speed, etc.

Method 200 includes an act of determining that the requested content is to be transferred in accordance with altered response buffering behavior based at least on the buffering behavior data (act 204). For example, content server 113 can determine that requested content produced at handler 134 is to be transferred in accordance with behavior data 133. Behavior data 133 can indicate that requested content produced at handler 134 is to be transferred in accordance with altered response buffering behavior. Thus, behavior data 133 can indicate response buffer behavior for content from handler 134 is an exception to the default response buffering behavior of content server 113.

Method 200 includes an act of accessing a portion of requested content (act 205). For example, content server 113 can send internal content request 182 (e.g., a program call) to handler 134. In response to receiving internal content request 182, handler 134 can invoke application 136 to produce requested content. Application 136 can then pass any produced content to handler 134. Handler 134 can return content 183 to content server 113. When appropriate, handler 124 can similarly invoke application 126 to produce requested content and can return requested content to content server 113.

Method 200 includes an act of transferring the portion of requested content in accordance with the altered response buffer behavior (act 206). For example, content server 113 can transfer content 183 in accordance with altered response buffer behavior indicated in behavior data 133.

Thus, depending on default response buffer behavior, content server 113 may or may not buffer content 183. It may be that altered response buffer behavior indicates that content 183 is to be sent to content browser 102 without any buffering, even though default response buffer behavior indicates (at least partial) buffering for content 183. Thus, content server 113 can send response 186, including content 183, to content browser 102 without buffering content 183.

On the other hand, it may be that altered response buffer behavior indicates that content 183 is to be (at least partially) buffered in buffer 116, even though default response buffer behavior indicates no buffering for content 183. Thus, content server 113 buffer content 182 in buffer 116. Once buffered, processing component 141, processing component 142, as well as other processing components in post processing pipeline 115 can access and process content 183. In some embodiments, content is buffered in buffer 116 but does not undergo any post processing.

When appropriate, for example, when content 183 along with other content represents a complete response to request 181, buffered/processed content 184 can be returned to content server 113. In response, content server 113 can send response 187, including buffered/processed content 184, to content browser 102.

Figure 3:
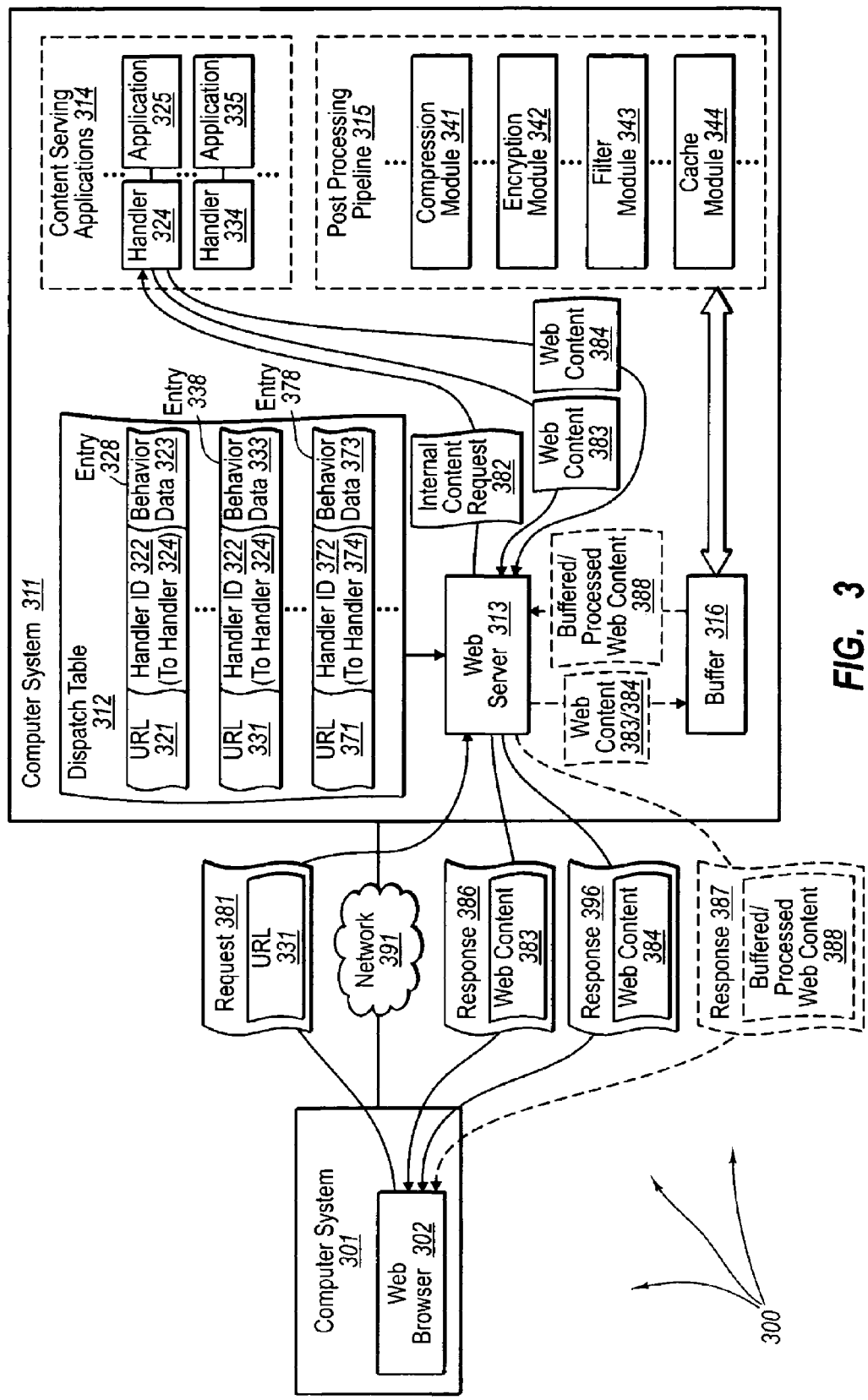
FIG. 3 illustrates another example computer architecture that facilitates managing network response buffering behavior.

FIG. 3 illustrates an example computer architecture 100 that facilitates managing network response buffering behavior. Computer architecture 300 includes computer system 301 and computer system 311. Each of computer system 301 and computer system 311 are connected to network 391. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), etc.) over network 391.

Generally, computer system 301 is configured to request, receive, and present Web based content. For example, Web browser 302 can send a request for content including a URL and a return electronic address (e.g., an IP address) onto network 391. Components of network 391 (e.g., routers) can route the request to a Web server identified in the content ID. Computer system 301 can receive requested content in a response from the Web server (e.g., sent a return IP address). Computer system 301 can process the requested content and Web browser 302 can present the requested content.

Generally, computer system 311 is configured to receive requests for Web based content, process the requests to identify requested Web based content, and return identified Web based content in a response to a received request. For example, Web server 313 can receive request 381, including URL 331, from Web browser 302. Request 381 can also include a return IP address to Web browser 302. Content server 313 can refer to dispatch table 312 to identify an application handler in content serving applications 314 that can produce content requested in request 381. For example, Web server 313 can identify entry 338 as corresponding to URL 331. From entry 338, Web server 313 can determine that handler ID 322 is pointer to handler 324 that can produce the requested content.

Computer system 311 also includes buffer 316. Web server 313 can be configured with a default response buffer behavior to buffer all content types from all applications in buffer 316 in order optimize response bandwidth and enable content post processing features. However, depending on various inputs (e.g., response size, handler content generation speed, handler specific buffering behavior data, etc.) Web server 313 may or may not buffer requested content in buffer 316 before sending a response that includes requested content.

In response to receiving request 381 and identifying handler ID 322, Web server 313 can access buffer behavior data 333 (for handler 334). The granularity for buffering behavior data can be a handler mapping. The granularity can ease configuration and management since a handler mapping corresponds to a particular application/content type that has specified response buffering behavior. In addition, handler mappings can be defined per URL such that per URL granularity response buffering behavior is supported.

For example, entries 328 and 329 correspond to URLs 321 and 331 respectively. However, URLs 321 and 331 both correspond to handler ID 322. Thus, content for URLs 321 and 331 is produced at handler 324. Nonetheless content produced for URL 321 and content produced for URL 331 are indicated to have different response buffering behavior. Content for URL 321 corresponds to behavior data 323 and content for URL 321 corresponds to behavior data 333. Accordingly different portions of content produced at handler 324 can have different response buffering behavior.

For example, it may be that handler 324 produces image data. URL 321 may be associated with a plurality of smaller images. Thus, behavior data 323 may indicate that for these smaller images the default response buffering behavior complete buffering) is to be utilized. Web server 313 can access behavior data 323 when a request for content at URL 321 is received.

On the other hand, URL 331 may be associated with one very large image. Thus, behavior data 333 may indicate that for this larger image the default response buffering behavior (complete buffering) is to be turned off (e.g., buffer size=0). Web server 313 can access behavior data 333 when a request for content at URL 331 is received.

When a request for content at URL 371 is received, Web server 313 can also access behavior data 373 to identify response buffering behavior for content produced at handler 374.

Based on behavior data in an entry, Web server 313 can determine if requested content is to be transferred in accordance with default response buffer behavior or in accordance with altered response buffer behavior indicating an exception to default response buffer behavior. For example, based at least in part on behavior data 333, Web server 313 can determine if content form handler 324 is to be buffered (default) or not buffered (altered).

In some embodiments, requirements for turning off response buffering can be viewed as hard requirements and soft requirements. A hard requirement is a requirement dictated by a handler. For example, a handler can indicate (through behavior data) that the hander is required to stream data. A soft requirement can balance various inputs to determine if turning response buffering off is appropriate. For example, an administrator can configure behavior data to potentially turn response buffering off balancing whether content is to be streamed, the rigidity of time to first byte requirements, memory usage, network bandwidth usage, need for post processing, response size, handler response generation speed, etc.

In some embodiments it may be appropriate completely turn off response buffering for a response. For example, when a response is relatively large (e.g., exceeds available memory in buffer 316) it may be detrimental to the performance of computer system 311 or impossible to store in memory. Thus, in these embodiments, buffer behavior data for a handler and/or content type can indicate that response buffering is to be turned off.

Further, content may have delivery rate requirements and/or time to first byte requirements. Buffering content can impact delivery rate requirements and time to first byte requirements. Thus, in these other embodiments, buffer behavior data for a handler and/or content type can indicate that response buffering is to be turned off.

Additionally, a handler may provide its own buffering and does not intend for Web server 313 to buffer content again. Double buffering content is an inefficient use of resources. Thus, in these further embodiments, buffer behavior data for a handler and/or content type can indicate that response buffering is to be turned off.

Web server 313 supports the use of a response buffering threshold that indicates whether content produced at a handler is or is not to be buffered. An administrator can set response buffer thresholds for handlers to implement desired response buffering behavior. A response buffering threshold can be a number that indicates how much data is to be buffered. A response buffering threshold of zero can indicate that response buffering is turned off.

If the size of produced content is equal to or less than a corresponding buffering threshold, the produced content can be buffered. On the other hand, if the size of produced content is greater than a corresponding buffering threshold, the produced content may not be buffered. In some embodiments, the response buffering threshold indicates a specified amount of content that is to be buffered before flushing the content to the client. When content is larger than an available buffer, the buffer can be repeatedly filled and flushed until all content is sent. Web server 313 can be configured to automatically resolve the buffering threshold for each handler mapping.

Web server 313 can send internal content request 382 to handler 324 to request that handler 324 produce content accessed through URL 331. In response handler 324 can return Web content 383 to Web server 313. Subsequently, handler 324 can also return Web content 384 to Web server 313.

If buffering is off (e.g., behavior data 333 has a response buffer threshold=0), Web content 383 and 384 are sent to Web browser 302 as they are received. For example, Web server 313 can send response 386, including Web content 383, to Web browser 302. Subsequently (after receiving Web content 384), Web server 313 can send response 396, including Web content 384, to Web browser 302.

On the other hand, if buffering is on, Web server 313 can buffer Web content 383 in buffer 316. Subsequently (after receiving Web content 384), Web server 313 can also buffer Web content 384 in buffer 316. Thus, Web content 383/384 is made available to post processing pipeline 315, including compression module 341, encryption module 342, filter module 343, and cache module 344. Accordingly, one or more of these modules can process Web content 383/384 resulting in buffered processed Web content 388.

When processing is complete, Web server 313 can retrieve buffered and/or processed Web content 388 from buffer 316. Web server 313 can send response 387 (e.g., using a return IP address), including buffered and/or processed content 388, to Web browser 302. However, in some embodiments, Web content 383 and 384 are buffered without being subjected to any post processing. Web browser 302 can receive and display any buffered and/or unbuffered Web based content.

In some embodiments, response buffering APIs are used to control response buffering behavior from an application. For example, in FIG. 1, application 126 or application 136 can call response buffering APIs to control their own response buffering behavior. Similarly, in FIG. 3, application 326 or application 376 can call response buffering APIs to control their own response buffering behavior.

Response buffering APIs can be used to control and/or enforce hard response buffering requirements. For example, response buffering APIs can be used to enforce streaming behavior based on arbitrary rules applied by an application producing requested content. Response buffering APIs can be used to override default response buffer behavior as well as altered response buffer behavior included in a dispatch table. Response buffering APIs can include:

WriteResponse( )—used to send data to the client, and may internally use response buffering based on the configuration information for the particular handler Flush( )—used to force the flush of the response buffer to the client. Applications can used this to control the buffering behavior of the server.

DisableResponseBuffering( )—used to turn off response buffering for the remainder of a request.

Accordingly, embodiments of the invention facilitate the ability to control response buffering for different content types and application parts associated with a content server. Further, embodiments provide options to define response buffering behavior in terms of runtime information, such as, for example, response size and handler response generation speed. Thus, for example, a content server can be generally configured to take advantage of response buffering, but still achieve streaming behavior and/or prevent large memory usage by a response buffer.

Additionally, response buffering behavior for an application can be controlled through configuration settings set by an administrator. Thus, application code does not have to be aware of response buffer semantics of a content server. Alternately, through response buffering APIs, an application can take control of its own response buffering behavior.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a content server for returning content to other computer systems, the computer system also including a content buffer configured to buffer content that is to be returned to other computer systems in response to requests for content, the computer system having default buffering behavior used to control content buffering at the content buffer, a method for applying content specific buffering behavior in response to a request for content, the method comprising:

an act of a content server receiving a request for content from a client, the content request including a content ID identifying the requested content;

an act of accessing a dispatch table that maps content IDs to handler IDs and portions of buffer behavior data, the handler IDs identifying handlers that are to generate at least a portion of requested content for corresponding content IDs, the portions of buffer behavior data indicating buffering behavior that is to be used when returning generated content for corresponding content IDs;

an act of referring to the dispatch table to the content ID included in the request to a corresponding handler ID of a handler configured to serve the requested content and to a corresponding portion of buffer behavior data indicating specific buffering behavior to be used for any requested content that is returned from the handler for the content ID, the specific buffering behavior differing from the default buffering behavior and differing from the buffering behavior indicated in at least one other portion of buffering behavior data in the dispatch table;

an act of accessing a portion of the requested content from the handler;

an act of buffering the portion of requested content at the content buffer in accordance with the specific buffering behavior indicated in the mapped to portion of buffer behavior data mapped to from the content ID; and an act of transferring the portion of requested content to the client in accordance with the specific buffering behavior indicated in the mapped to portion of buffer behavior data mapped to from the content ID.

2. The method as recited in claim 1, wherein the act of receiving a request for content comprises an act of receiving a URL.

3. The method as recited in claim 1, wherein the act of receiving a request for content comprises an act of a Web server receiving a request for content.

4. The method as recited in claim 1, wherein the act of mapping the content ID to a corresponding handler ID comprises an act of mapping a URL to a corresponding handler ID.

5. The method as recited in claim 1, wherein the specific buffering behavior comprises buffering behavior that indicates content from the handler is to bypass the content buffer.

6. The method as recited in claim 1, wherein the act of mapping the content ID to a portion of buffer behavior data comprises an act of receiving a response buffer API call from an application corresponding to the handler.

7. The method as recited in claim 1, wherein an act of buffering the portion of requested content at the content buffer in accordance with the specific buffering behavior indicated in the portion of buffer behavior data comprises an act of bypassing the buffering because the portion of requested content exceeds available memory of the content buffer, even though the default response buffering behavior is to buffer requested content.

8. The method as recited in claim 1, wherein an act of buffering the portion of requested content at the content buffer in accordance with the specific buffering behavior indicated in the portion of buffer behavior data comprises an act of determining that requested content has at least one of time to first byte and transfer rate requirements.

9. The method as recited in claim 1, wherein an act of buffering the portion of requested content at the content buffer in accordance with the specific buffering behavior indicated in the portion of buffer behavior data comprises an act of determining that the handler provides its own buffering.

10. The method as recited in claim 1, wherein an act of buffering the portion of requested content at the content buffer in accordance with the specific buffering behavior indicated in the portion of buffer behavior data comprises an act of buffering the portion of requested content even though default buffering behavior indicates that requested content is not to be buffered.

11. The method as recited in claim 1, wherein the act of transferring the portion of requested content to the client comprises an act of the content server sending the portion of requested content directly to the client.

12. The method as recited in claim 1, further comprising:

an act of performing a post processing operation on the portion of requested content, the post processing operation selected from among compressing the portion of content, encrypting the portion of content, filtering the portion of content, and caching the portion of content.

13. The method as recited in claim 12, further comprising:

an act of the content server retrieving the processed portion of requested content from the content buffer; and an act of the content server sending the processed portion of requested content to the client.

14. At a computer system, the computer system including a Web server for returning content to other computer systems, the computer system also including a content buffer configured to buffer content that is to be returned to other computer systems in response to requests for content, the computer system having default buffering behavior used to control content buffering at the content buffer, a method for applying content specific buffering behavior in response to a request for Web based content, the method comprising:

an act of the Web server receiving a URL from a client;

an act of accessing a dispatch table that maps URLS to handler IDs and portions of buffer behavior data, the handler IDs identifying handlers that are to generate at least a portion of requested content for corresponding URLs, the portions of buffer behavior data indicating buffering behavior that is to be used when returning generated content for corresponding URLs;

an act of referring to the dispatch to map the URL to a corresponding handler configured to serve requested Web based content for the portion of the Web server namespace represented in the URL and to a corresponding portion of buffer behavior data indicating specific buffering behavior to be used for any requested content that is returned from the handler for the URL, the specific buffering behavior differing from the default buffering behavior and differing from the buffering behavior indicated for at least one other URL that also maps to the handler;

an act of accessing a portion of the requested Web based content from the handler;

an act of buffering the portion of requested content at the content buffer in accordance with the specific buffering behavior indicated in the mapped portion of buffer behavior data mapped to from the URL; and an act of transferring the portion of requested Web based content to the client in accordance with the specific buffering behavior indicated in the mapped portion of buffer behavior data mapped to from the URL.

15. The method as recited in claim 14, wherein the act of buffering the portion of requested content at the content buffer in accordance with the specific buffering behavior indicated in the portion of buffer behavior data comprises an act of determining that the requested Web based content is to be transferred in accordance with buffering behavior indicated by the handler.

16. The method as recited in claim 14, wherein the act of buffering the portion of requested content at the content buffer in accordance with the specific buffering behavior indicated in the portion of buffer behavior data comprises an act of determining that the requested Web based content is to be transferred in accordance with buffering behavior based on a content type of the requested Web based content.

17. A computer system, comprising:
one or more processors;
system memory;
a content buffer configured to buffer content that is to be returned to other computer systems in response to requests for content;
one or more computer-readable media having stored thereon computer-executable-instructions representing a content server configured for returning content to other computer systems, the content server further configured to:
have default buffering behavior when transferring content;
receive requests for content from a client, the requests including a content ID identifying requested content;
access a dispatch table that maps content IDs to handler IDs and portions of buffer behavior data, the handler IDs identifying handlers that are to generate at least a portion of requested content for corresponding content IDs, the portions of buffer behavior data indicating buffering behavior that is to be used when returning generated content for corresponding content IDs;
refer to the dispatch table to map requests to a corresponding handler ID of a handle configured to serve the requested content and to a corresponding portion of buffer behavior data indicating specific buffering behavior to be used for any requested content that is returned from the handler for the content ID, the specific buffering behavior differing from the default buffering behavior and differing from the buffering behavior indicated in at least one other portion of buffering behavior data in the dispatch table;
access portions of the requested content from the handler;
buffer portions of requested content at the content buffer in accordance with the specific buffering behavior indicated in the mapped to portion of buffer behavior data mapped to from the content ID; and
transfer portions of requested content to clients in accordance with the specific buffering behavior indicated in the mapped to portion of buffer behavior data mapped to from the content ID.

* * * * *